N. REITER.
MILKING STOOL.
APPLICATION FILED DEC. 12, 1911.
1,021,263.
Patented Mar. 26, 1912.
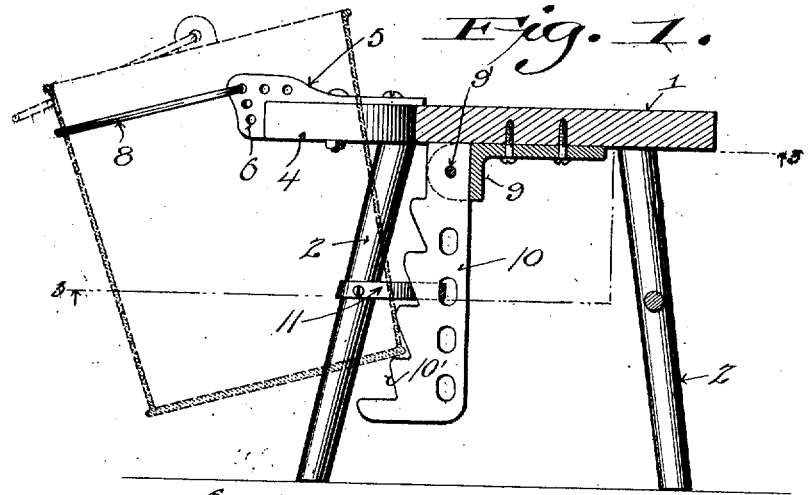
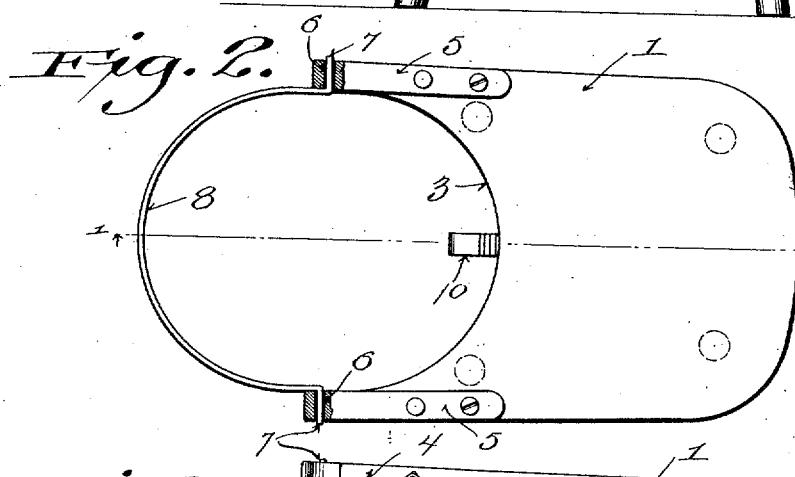
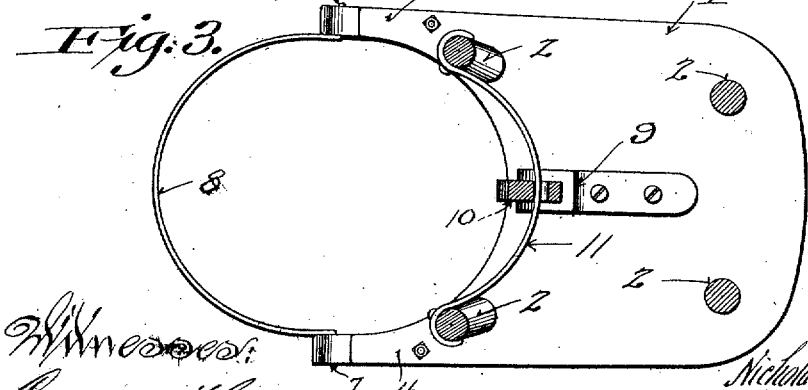
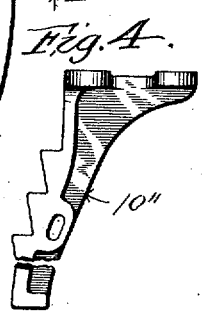

UNITED STATES PATENT OFFICE.

NICHOLAS REITER, OF RACINE, WISCONSIN.

MILKING-STOOL.

1,021,263.  Specification of Letters Patent.  Patented Mar. 26, 1912.

Application filed December 12, 1911. Serial No. 665,324.

*To all whom it may concern:*

Be it known that I, NICHOLAS REITER, a citizen of the United States, and resident of Racine, in the county of Racine and State of Wisconsin, have invented certain new and useful Improvements in Milking-Stools; and I do hereby declare that the following is a full, clear, and exact description thereof.

My invention has for its object to provide a simple, economical milking stool, its construction and arrangement being such that it is capable of detachably holding a milk-pail at various adjustable angles and elevations.

With the above object in view the invention consists in certain peculiarities of construction and combination of parts as hereinafter described with reference to the accompanying drawings and subsequently claimed.

In the drawings Figure 1 represents a central sectional elevation of a milk-stool embodying the features of my invention, the section being indicated by line 1—1 of Fig. 2, there being a pail shown in connection with the stool in dotted lines; Fig. 2, a top plan view of the same with parts broken away and in section; Fig. 3, an inverted plan view partly in section, the section being indicated by line 3—3 of Fig. 1, and Fig. 4, a detail modified form of attaching a pail-supporting leg.

Referring by characters to the drawings, 1 represents a seat and 2 the legs, which legs are connected by suitable braces that form no part of my invention. The front end of the seat is cut away to form a circular recess 3 adapted to receive the pail body. The recess 3 is disposed forwardly of the front legs of the stool and its sides in connection with the seat form forwardly extending arms 4, to which arms are secured ear-brackets 5 provided with a series of horizontal and vertically disposed apertures 6 for the reception of trunnion ends 7 of a bail 8, the apertures serving as a adjustment whereby the bail may be moved in or out with respect to the circular recess, or downward to conform to pails of various diameters.

As best shown in Fig. 1 the bottom face of the seat has secured thereto a bracket 9 between ears of which is fitted a rack-leg 10, the same being secured to the bracket by a bolt 9'. The rack-leg is provided with a series of forwardly disposed teeth 10' as shown and is also apertured at intervals for the purpose of economy, one of the apertures serving as a receiver for a circular cross-brace 11, the ends of which brace are connected to the forward legs of the stool, the said brace serving to add rigidity to the rack-leg. As best shown in Fig. 1, by this arrangement of bail and rack-leg it is apparent that a pail can be readily inserted between the bail and circular recess 3 and its bottom arranged to engage any one of the teeth 10' of the rack-leg whereby the elevation and angle of the pail can be adjusted conveniently with respect to the teats of a cow, the bail being at a proper milking angle and the milker can be conveniently seated just rearwardly of the pail whereby perfect control of the pail can be had, it being understood that said pail can be readily lifted from its seat when filled.

Fig. 4 represents another form of rack-leg wherein the bracket connection is dispensed with and said leg and bracket is formed in one piece. In this or the other form of rack-leg shown, if desired, it may extend to the floor-level and constitute a supporting leg for the stool in connection with the two rear legs whereby the front set of legs are dispensed with.

While I have shown and described a certain specific arrangement of parts for carrying out my invention it is understood that the same may be varied as, for instance, the stool seat in some instances may be made of pressed steel, in which case the bracket ears could be formed integral therewith.

I claim:

1. A milking stool comprising a leg-supported seat having forwardly projecting arms, ears carried by the arms, a pail-supporting bail in pivotal connection with the ears, and a vertical rack-leg disposed under the stool intermediate of the forwardly projecting seat arms.

2. A milking stool comprising a seat having its forward end provided with a recess, the side walls of the recess constituting forwardly projecting arms, apertured ears secured to the seat arms, a bail having shanks for engagement with the ear apertures, supporting legs for the seat, and a rack-leg depending from said seat adapted to support a pail bottom.

In testimony that I claim the foregoing I have hereunto set my hand at Racine in the county of Racine and State of Wisconsin in the presence of two witnesses.

NICHOLAS REITER.

Witnesses:
 JOSEPH KAISER,
 W. J. JANDL.